US009743164B2

(12) United States Patent
McLean et al.

(10) Patent No.: US 9,743,164 B2
(45) Date of Patent: Aug. 22, 2017

(54) DISPLACEABLE SPEAKER ARRAY AND RELATED ASSEMBLIES

(71) Applicant: Bose Corporation, Framingham, MA (US)

(72) Inventors: Barry Robert McLean, Holden, MA (US); Scott Avery Boulanger, Highland, MI (US); Corey A. Freimark, Grand Haven, MI (US); John S. Scales, Ann Arbor, MI (US)

(73) Assignee: Bose Corporation, Framingham, MA (US)

( * ) Notice: Subject to any disclaimer, the term of this patent is extended or adjusted under 35 U.S.C. 154(b) by 130 days.

(21) Appl. No.: 14/672,379

(22) Filed: Mar. 30, 2015

(65) Prior Publication Data

US 2016/0295309 A1 Oct. 6, 2016

(51) Int. Cl.
*H04B 1/00* (2006.01)
*H04R 1/02* (2006.01)

(52) U.S. Cl.
CPC ............. *H04R 1/025* (2013.01); *H04R 1/026* (2013.01); *H04R 2499/13* (2013.01)

(58) Field of Classification Search
CPC ........ H04B 1/082; H04B 1/088; H04R 1/025; H04R 2499/13
USPC ........................... 381/86, 302, 332, 365, 389
See application file for complete search history.

(56) References Cited

U.S. PATENT DOCUMENTS 4,723,633 A * 2/1988 Duncan ..................... E04G 5/02 16/19
4,940,281 A * 7/1990 Komatsu .................. B60Q 1/05 296/193.09
5,859,917 A 1/1999 Silber et al.
6,079,515 A 6/2000 Newman
6,292,573 B1 9/2001 Zurek et al.
6,608,909 B2 8/2003 Brady
6,631,191 B1 10/2003 Holmberg
7,218,746 B2 5/2007 Schmidt et al.
7,299,078 B2 11/2007 Ahn
7,661,749 B2 2/2010 Balcerzak et al.
7,684,584 B2 * 3/2010 Hsu ........................ G11B 31/00 381/386
7,702,123 B2 * 4/2010 Soerensen ............. H04N 5/642 181/176
7,756,286 B2 7/2010 Kim
7,787,637 B2 8/2010 Kong
7,889,505 B1 2/2011 Beard
7,970,149 B2 6/2011 Reardon et al.
7,991,175 B2 8/2011 Nielsen et al.
8,014,554 B2 9/2011 Xu et al.
8,126,187 B2 2/2012 Ludwig et al.
(Continued)

OTHER PUBLICATIONS

Elliott, p. 1-3, https://www.youtube.com/watch?v=WSIvh72OEI8, 2013.*

*Primary Examiner* — William A Jerez Lora
(74) *Attorney, Agent, or Firm* — Bose Corporation

(57) ABSTRACT

A displaceable speaker assembly for a vehicle includes a housing, a speaker array rotatably coupled to the housing and including a plurality of electro-acoustic transducers (e.g., twiddlers), a drive unit coupled to the housing, and a lever assembly coupling the drive unit to the speaker array. The drive unit is operable to drive motion of the lever assembly, which, in turn, drives rotation of the speaker array relative to the housing.

18 Claims, 8 Drawing Sheets

(56) References Cited

U.S. PATENT DOCUMENTS

| | | | | | |
|---|---|---|---|---|---|
| 8,175,318 | B2 | 5/2012 | Pieklik et al. | | |
| 8,189,849 | B2 | 5/2012 | Waddell et al. | | |
| 8,194,897 | B2 | 6/2012 | Choi | | |
| 8,199,957 | B2 | 6/2012 | Ohguchi et al. | | |
| 8,224,014 | B2 | 7/2012 | Sprinkle | | |
| 8,279,591 | B2 | 10/2012 | Chiu | | |
| D670,678 | S | 11/2012 | Hermansen | | |
| 8,325,965 | B2 | 12/2012 | Blackmon et al. | | |
| 8,520,883 | B2 | 8/2013 | Tracy | | |
| 8,526,661 | B2 | 9/2013 | Newberg et al. | | |
| 8,526,662 | B2 | 9/2013 | Tracy | | |
| 8,577,068 | B2 | 11/2013 | Oh | | |
| 2007/0058377 | A1 * | 3/2007 | Zampini, II | F21V 15/013 | 362/372 |
| 2007/0140508 | A1 * | 6/2007 | Soerensen | H04N 5/642 | 381/87 |
| 2008/0141924 | A1 * | 6/2008 | Adams | B63B 35/85 | 114/343 |
| 2010/0032258 | A1 * | 2/2010 | Mevissen | F16D 7/022 | 192/56.2 |
| 2012/0128194 | A1 | 5/2012 | Oh | | |
| 2012/0134526 | A1 | 5/2012 | Oh | | |
| 2013/0329936 | A1 * | 12/2013 | Tseng | H04R 1/02 | 381/387 |
| 2015/0003658 | A1 * | 1/2015 | Sato | H04R 1/025 | 381/349 |

* cited by examiner

DISPLACEABLE SPEAKER ARRAY AND RELATED ASSEMBLIES

BACKGROUND

This disclosure relates to a displaceable speaker array, and, more particularly, to a displaceable speaker array for a vehicle instrument panel.

SUMMARY

All examples and features mentioned below can be combined in any technically possible way.

In one aspect, a displaceable speaker assembly for a vehicle. The speaker assembly includes a housing, a speaker array rotatably coupled to the housing and including a plurality of electro-acoustic transducers (e.g., twiddlers), a drive unit (e.g., a motor, such as a stepper motor, and a geartrain) coupled to the housing, and a lever assembly coupling the drive unit to the speaker array. The drive unit is operable to drive motion of the lever assembly, which, in turn, drives rotation of the speaker array relative to the housing.

Implementations may include one of the following features, or any combination thereof.

In some implementations, the speaker assembly is configured to fit within an instrument panel surface of the vehicle.

In certain implementations, the speaker array also includes a face plate which supports the plurality of electro-acoustic transducers; and an enclosure which encloses rear radiating surfaces of the electro-acoustic transducers.

In some examples, the faceplate defines a port, and the enclosure acoustically connects the rear radiating surfaces of the transducers with the port.

In certain examples, the speaker assembly also includes a dovetail mount coupled to the speaker array; a bridge member coupled to the lever assembly; and an adjustment screw coupling the bridge member to the dovetail mount and allowing for adjustment of the position of the speaker assembly relative to the housing.

In some cases, a first end of the bridge member is rotatably coupled to the lever assembly, and the dovetail mount defines a dove tail groove which slidably receives a second end of the bridge member.

In some cases, the speaker assembly also includes a nut for engaging the adjustment screw, and the dovetail mount further defines a pocket for receiving and supporting the nut.

In some implementations, the speaker assembly also includes a mounting bracket coupled to the housing and configured to support the drive unit and the lever assembly. The mounting bracket includes a bumper which limits rotation of the lever assembly thereby to inhibit over travel of the lever assembly.

In certain implementations, the bumper inhibits the speaker array from moving, relative to the housing, from an open position to a closed position when the speaker assembly is exposed to mechanical force.

In another aspect, an instrument panel for a vehicle includes a displaceable speaker assembly. The speaker assembly includes a housing mounted to the instrument panel; a speaker array rotatably mounted to the housing and including a plurality of electro-acoustic transducers, a drive unit coupled to the housing, and a lever assembly coupling the drive unit to the speaker array. The drive unit is operable to drive motion of the lever assembly, which, in turn drives rotation of the speaker array relative to the housing. The speaker array is displaceable between a first, closed position in which the electro-acoustic transducers are disposed substantially beneath a surface of the instrument panel, and a second, open position in which the electro-acoustic transducers are disposed substantially above the surface of the instrument panel.

Implementations may include one of the above and/or below features, or any combination thereof.

In some implementations, the electro-acoustic transducers include twiddlers, which are arranged to collectively produce sound in a frequency range of a full-range driver.

BRIEF DESCRIPTION OF THE DRAWINGS

Like reference numerals represent like features.

DETAILED DESCRIPTION

This disclosure relates to a displaceable speaker array for a vehicle instrument panel. The speaker array includes a plurality of electro-acoustic devices in a ported enclosure. The array mechanism is activated with a drive unit. The mechanism employs lever arms that are blocked during over travel to prevent damage from excessive mechanical shock or other loading on the speaker enclosure. An adjustment screw is utilized to allow an assembler the ability of setting a height of the speaker array, relative to an outer surface of the instrument panel, very precisely (e.g., such that trim covering the speaker array is substantially flush with the surface of the instrument panel when the speaker array is in a closed position.

Figure 1A:
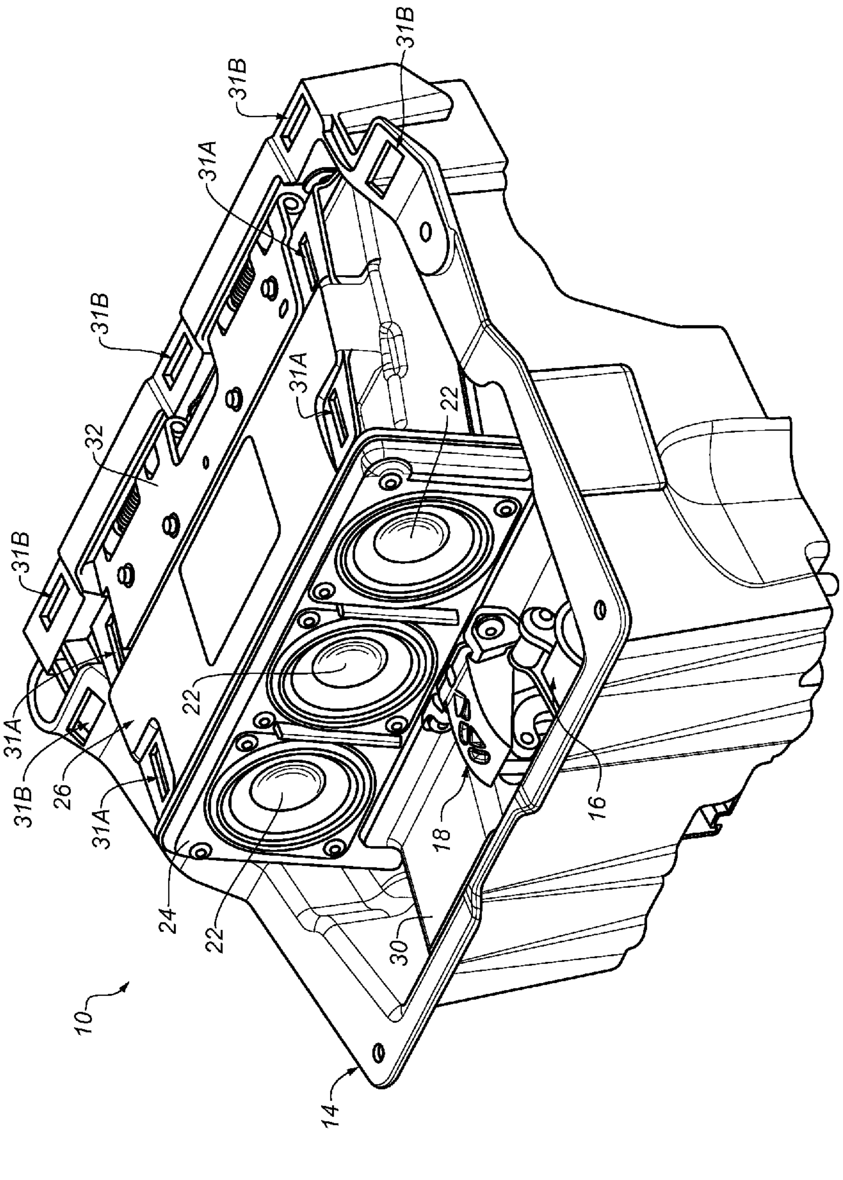
FIG. 1A is a perspective view of a displaceable speaker assembly.
Figure 1B:
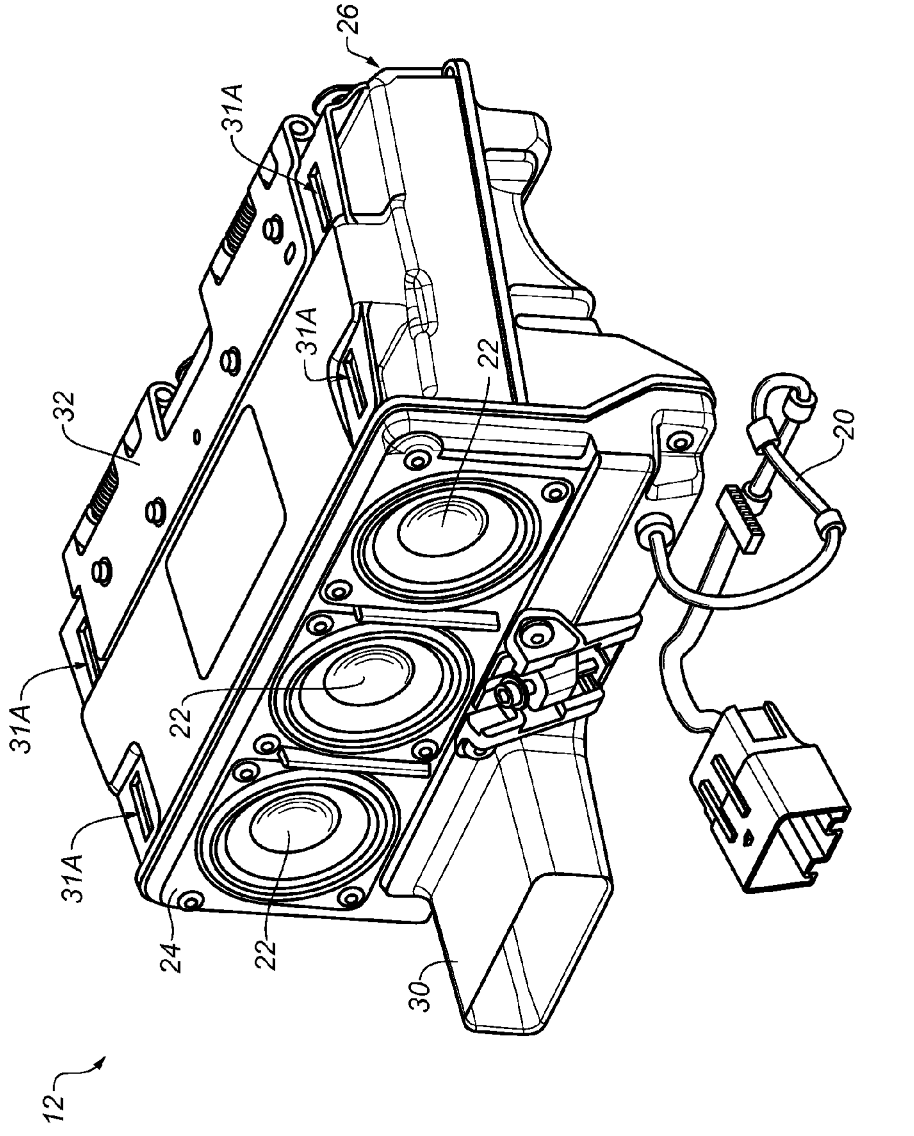
FIG. 1B is a perspective view a speaker array from the speaker assembly of FIG. 1A.

Referring to FIGS. 1A and 1B, a displaceable speaker assembly 10 is designed to fit within an instrument panel of a vehicle. The speaker assembly 10 includes a speaker array 12; a housing 14; an actuator assembly 16; a lever assembly 18; and an internal harness 20 that connects the speaker array 10 and the actuator assembly 16 to an electrical connector 21 (FIG. 1C).

The speaker array 12 (a/k/a “line array”) includes three (3) electroacoustic-transducers 22 attached to a plastic faceplate 24; and a 2-piece enclosure 26 (e.g., a 1.2 liter to 1.3 liter ported enclosure). In the illustrated example, the electro-acoustic transducers 22 are twiddlers (i.e., combination tweeter/mid-range drivers) which individually can reproduce sound in a frequency range of about 300 Hz to about 20 kHz. The 2-piece enclosure 26 encloses the rear radiating surfaces of the electro-acoustic transducers 22 and acoustically connects the rear radiating surfaces of the electro-acoustic transducers 22 with a port 30 on the faceplate 24. Apertures 31A and 31B are provided in the enclosure 26 and in the housing 14, respectively, for mounting pieces of vehicle trim (e.g., instrument panel trim) thereto.

The speaker array 12 is rotatably attached to the housing 14 via a hinge 32 that runs along a back edge of the enclosure 26. The speaker array 12 provides for greater radiating surface area than a single one of the electro-acoustic transducers 22 alone while avoiding the packaging limitations of a single larger electro-acoustic transducer. The result is a low profile package that can reproduce sound in a wider frequency range, such as that of a larger single electro-acoustic transducer (e.g., a full range driver which reproduces sound covering the audio spectrum above 100 Hz (e.g., about 100 Hz to about 20 kHz).

Figure 1C:
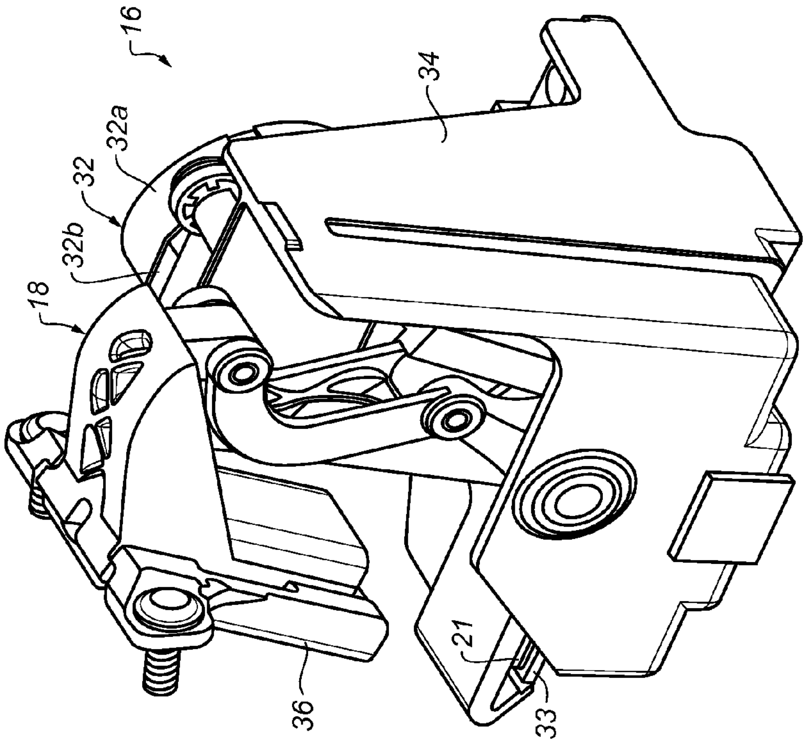
FIG. 1C is a perspective view of an actuator assembly and a lever assembly from the speaker assembly of FIG. 1A.

Referring to FIG. 1C, the actuator assembly 16 includes a drive unit 32 and a printed circuit board with motion control electronics 33 supported in a mounting bracket 34 which is attached to the housing 14 (FIG. 1A). In one example, the drive unit 32 includes a motor 32*a* and a geartrain 32*b* which couples the motor 32*a* to the lever assembly 18 and provides a 100:1 reduction. The motor 32*a* may be a stepper motor or a brushed DC motor. Suitable drive units include EAD climate control actuators available from Johnson Electric. The mounting bracket 34 also supports the lever assembly 18, which joins the drive unit 32 to a dovetail mount 36 that is attached to the faceplate 24 (FIG. 1B) (e.g., via mechanical fasteners and/or adhesive).

Figure 2A:
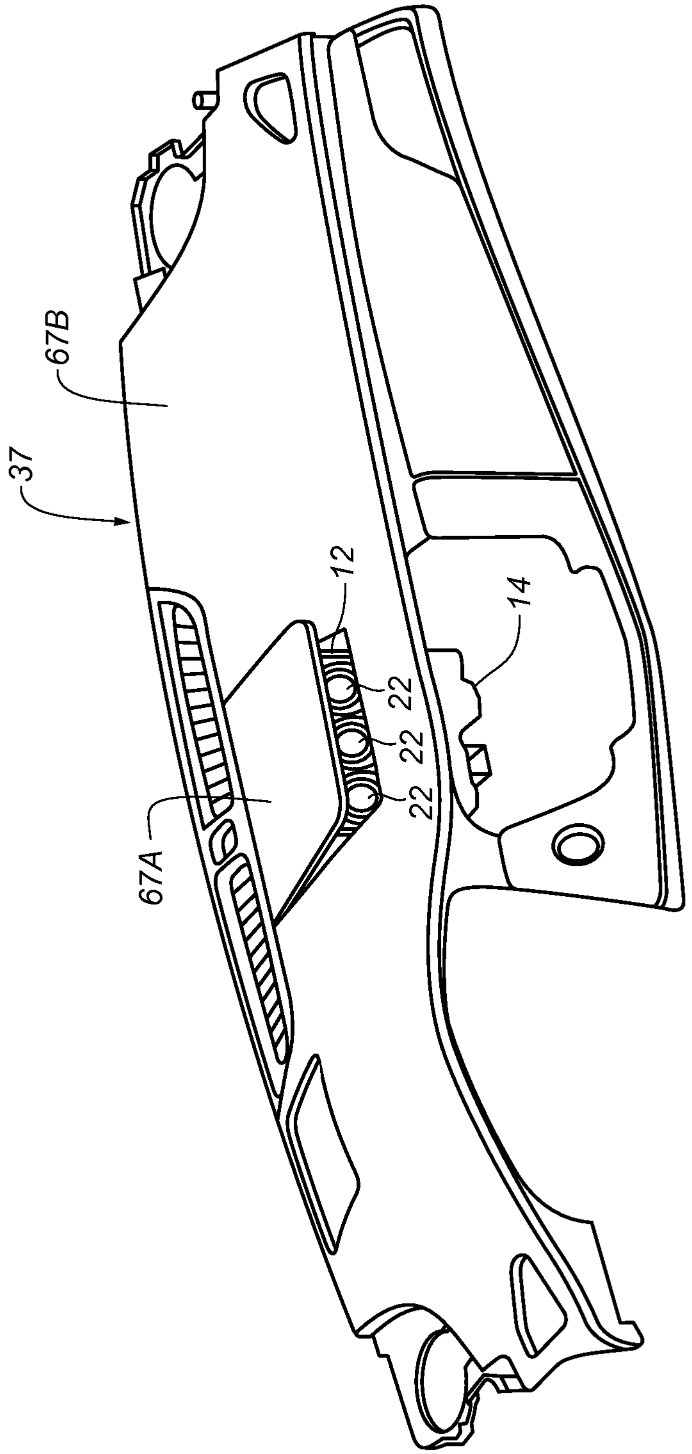
FIGS. 2A and 2B are perspective views of the speaker assembly of FIG. 1A mounted in a vehicle instrument panel and illustrate a speaker array of the assembly in an open position and a closed position, respectively.
Figure 2B:
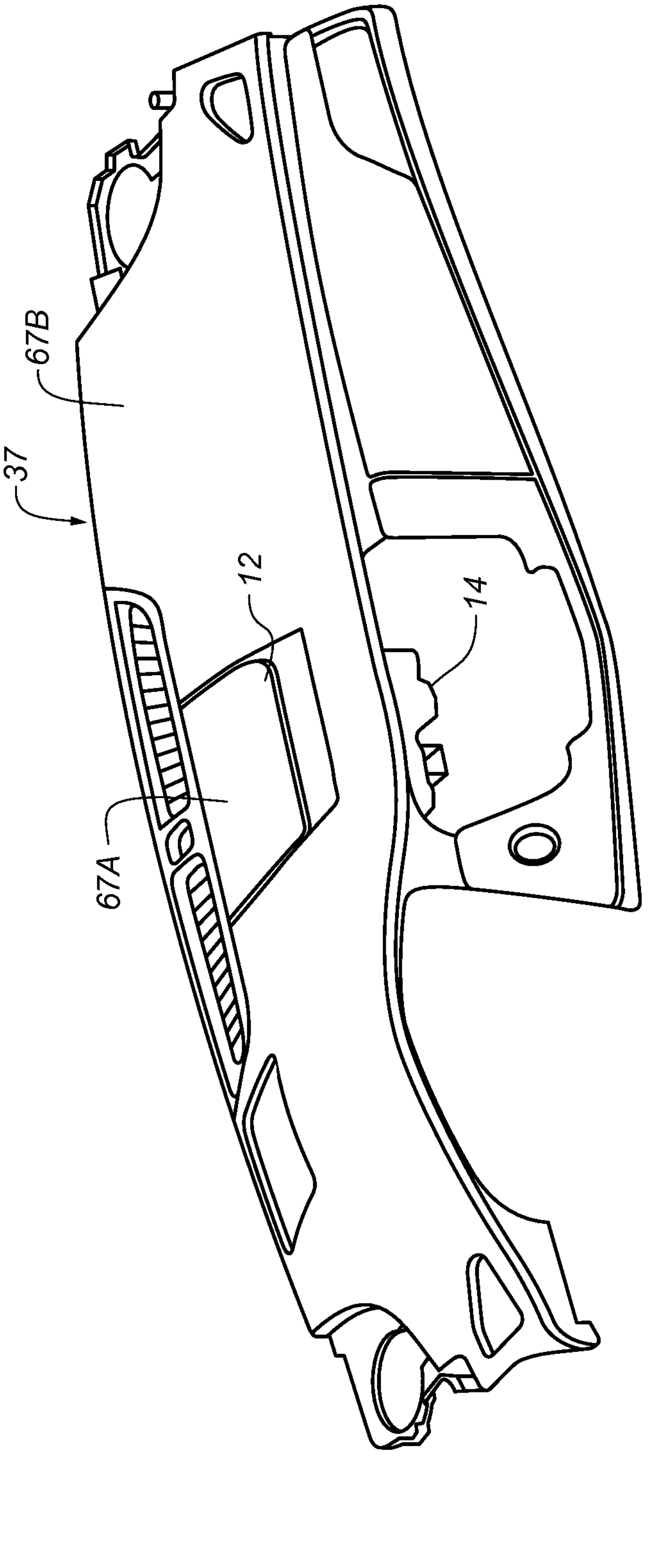

In use, the housing 14 is fixedly mounted to an instrument panel of a vehicle. The housing 14 remains fixed relative to the instrument panel while the speaker array 24 is displaceable, between an open position and a closed position, relative to the instrument panel and the housing 12. FIGS. 2A and 2B illustrate the speaker array 12 in an open/raised position (FIG. 2A), in which the electro-acoustic transducers 22 are disposed substantially above the upper surface of the instrument panel 37, and a closed position (FIG. 2B), in which the electro-acoustic transducers 22 (not visible in FIG. 2B) are disposed substantially beneath the upper surface of the instrument panel 37. Typically, the electro-acoustic transducers 22 will be disposed behind a grille which has been removed from the figures for clarity. The speaker array 12 will activate (transition from the closed position to the raised position) when power is applied to the vehicle's audio system. The speaker array 12 is designed to rise up—driven by the drive unit 32 and the lever assembly 18—from the surface of the instrument panel 37 at an angle of about 14 degrees.

Figure 3A:
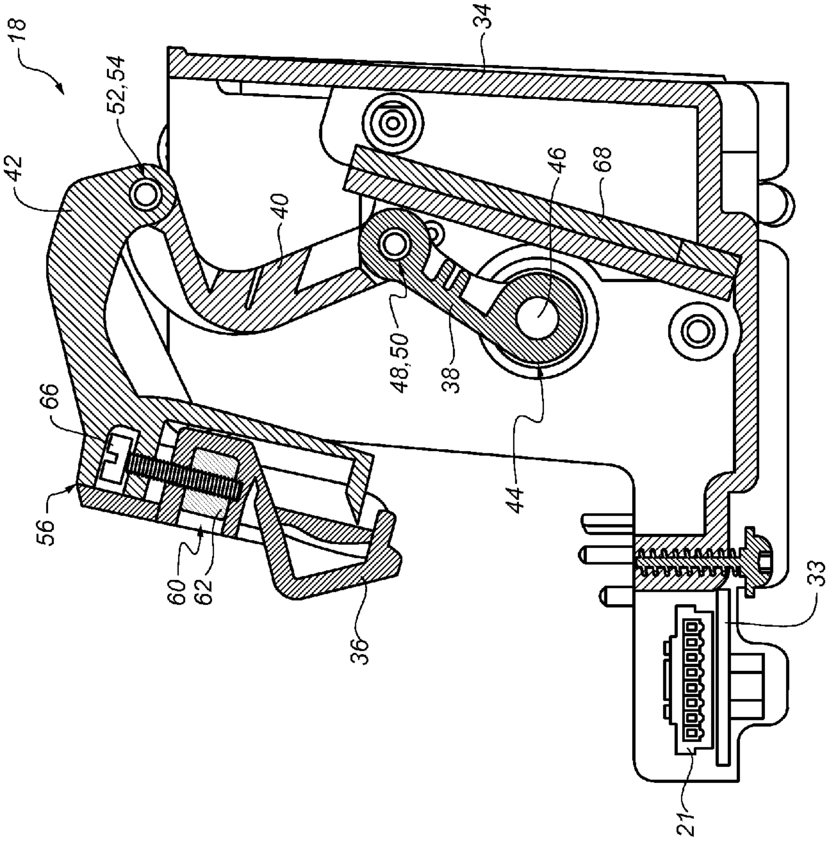
FIGS. 3A and 3B are cross-sectional side views of an actuator assembly and a lever assembly—shown in an open position and a closed position, respectively—from the speaker assembly of FIG. 1A.
Figure 3B:
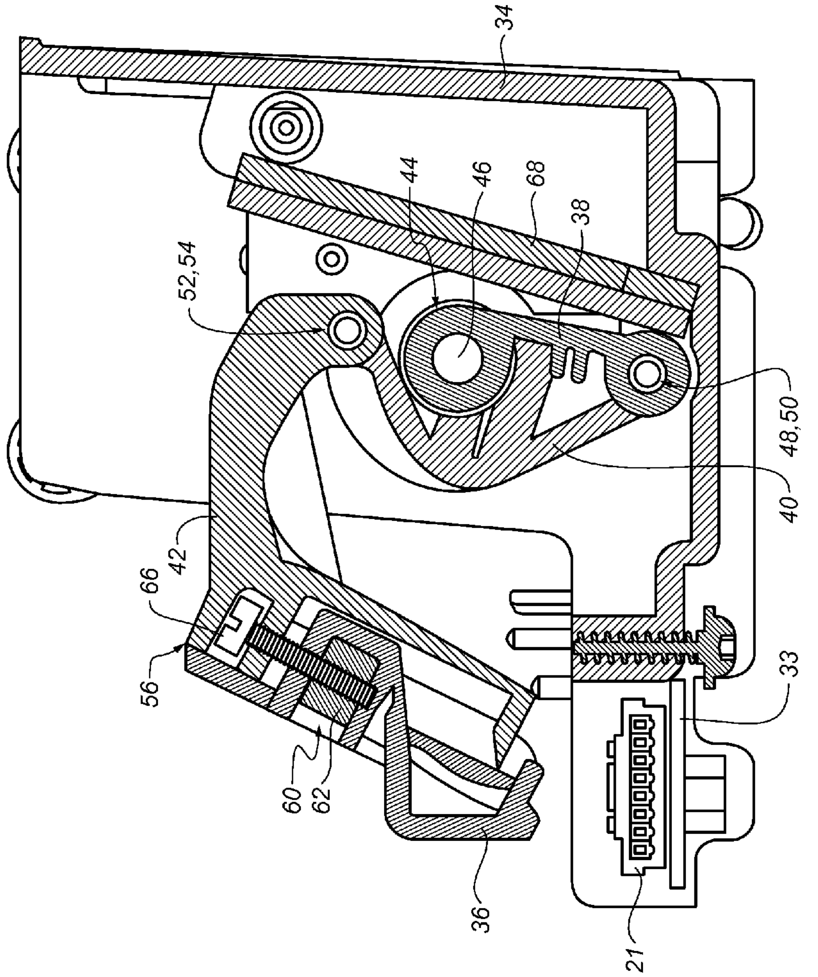
Figure 4:
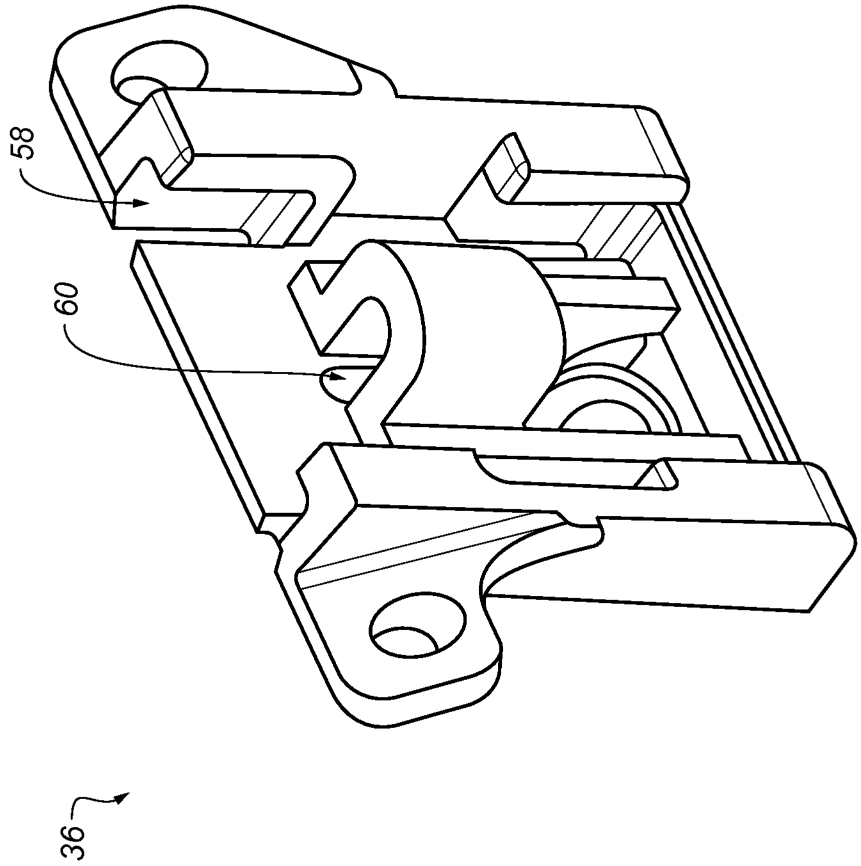
FIG. 4 is a perspective view of a dovetail mount from the speaker assembly of FIG. 1A.

Referring to FIGS. 3A and 3B, the lever assembly 18 includes a pair of lever arms (i.e., first and second lever arms 38, 40) and a bridge member 42. A first end 44 of the first lever arm 38 is coupled to a shaft 46 of the drive unit 32. A second end 48 of the first lever arm 38 is rotatably coupled to a first end 50 of the second lever arm 40. A second end 52 of the second lever arm 40 is rotatably coupled to a first end 54 of the bridge member 42. A second end 56 of the bridge member 42 is slidably received in a dove tail groove 58 (FIG. 4) formed in the dovetail mount 36.

The dovetail mount 36 also defines a pocket 60 which receives and supports a nut 62. An adjustment screw 66 couples the bridge member 42 to the nut 62 and allows for adjustment of the bridge member 42 relative to the dovetail mount 36. The adjustment screw 66 can be utilized to allow an assembler to set the height of the array assembly 10 very precisely. This can help to provide the best alignment possible between the array assembly 10 and the vehicle trim (e.g., the surface of the instrument panel) within which the array assembly 10 is mounted, e.g., such that a first piece of vehicle trim 67A (FIGS. 2A and 2B) attached to the enclosure 26 is substantially flush with a second piece vehicle trim (FIGS. 2A and 2B) attached to the housing 14. In some cases, a spring washer (not shown) may be provided beneath a head of the adjustment screw 66 to help ensure a tight fit.

The drive unit 32 drives motion of the lever assembly 18, which, in turn, drives motion of the speaker array 12 relative to the housing 14. Notably, the mounting bracket 34 includes a bumper 68 which limits rotation of the first lever arm 38 to inhibit over travel and prevent damage to the system from excessive forces, such as those that occur in a vehicle driving over cracks and bumps at high rates of speed. Specifically, the first lever arm 38 may rotate about 200 degrees from the closed position to the open position before the second end 48 of the first lever arm 38 and/or the first end 50 of the second lever arm 40 engages the bumper 68 which restricts further movement. The bumper 68 thus prevents the speaker array 12 from slamming closed into the housing 14 when the vehicle is exposed to excessive forces. The bumper 68 may be formed of a compliant material such as an elastomer.

A number of implementations have been described. Nevertheless, it will be understood that additional modifications may be made without departing from the scope of the inventive concepts described herein, and, accordingly, other implementations are within the scope of the following claims.

What is claimed is:

1. A displaceable speaker assembly for a vehicle, the speaker assembly comprising:

a housing;

a speaker array rotatably coupled to the housing, the speaker array comprising plurality of electro-acoustic transducers;

a drive unit coupled to the housing, the drive unit having a shaft; and a lever assembly coupling the drive unit to the speaker array, wherein the lever assembly includes a first lever arm, a second lever arm, and a bridge member, a first end of the first lever arm being coupled to the shaft of the drive unit, a second end of the first lever arm being rotatably coupled to a first end of the second lever arm, and a second end of the second lever arm being rotatably coupled to a first end of the bridge member;

a dovetail mount coupled to the speaker array; and an adjustment screw coupling the bridge member to the dovetail mount and allowing for adjustment of a position of the speaker assembly relative to the housing;

wherein the drive unit is operable to drive motion of the lever assembly, which, in turn, drives rotation of the speaker array relative to the housing.

2. The speaker assembly of claim 1, wherein the speaker assembly is configured to fit within an instrument panel surface of the vehicle.

3. The speaker assembly of claim 1, wherein the electro-acoustic transducers comprise twiddlers.

4. The speaker assembly of claim 1, wherein the speaker array comprises:

a face plate which supports the plurality of electro-acoustic transducers; and an enclosure which encloses rear radiating surfaces of the electro-acoustic transducers.

5. The speaker assembly of claim 4, wherein the faceplate defines a port, and wherein the enclosure acoustically connects the rear radiating surfaces of the transducers with the port.

6. The speaker assembly of claim 1, wherein the dovetail mount defines a dove tail groove which slidably receives a second end of the bridge member.

7. The speaker assembly of claim 1, further comprising a nut for engaging the adjustment screw, wherein the dovetail mount further defines a pocket for receiving and supporting the nut.

8. The speaker assembly of claim 1, further comprising a mounting bracket coupled to the housing and configured to support the drive unit and the lever assembly, wherein the mounting bracket comprises a bumper which limits rotation of the lever assembly thereby to inhibit over travel of the lever assembly.

9. The speaker assembly of claim 8, wherein the bumper inhibits the speaker array from moving, relative to the housing, from an open position to a closed position when the speaker assembly is exposed to mechanical force.

10. An instrument panel for a vehicle, the instrument panel comprising:

a displaceable speaker assembly comprising:

a housing mounted to the instrument panel;

a speaker array rotatably mounted to the housing, the speaker array comprising a plurality of electro-acoustic transducers;

a drive unit coupled to the housing, the drive unit having a shaft; and a lever assembly coupling the drive unit to the speaker array, wherein the lever assembly includes a first lever arm, a second lever arm, and a bridge member, a first end of the first lever arm being coupled to the shaft of the drive unit, a second end of the first lever arm being rotatably coupled to a first end of the second lever arm, and a second end of the second lever arm being rotatably coupled to a first end of the bridge member, wherein the drive unit is operable to drive motion of the lever assembly, which, in turn drives rotation of the speaker array relative to the housing, wherein the speaker array is displaceable between a first, closed position in which the electro-acoustic transducers are disposed substantially beneath a surface of the instrument panel, and a second, open position in which the electro-acoustic transducers are disposed substantially above the surface of the instrument panel.

11. The instrument panel of claim 10, wherein the electro-acoustic transducers comprise twiddlers, which are arranged to collectively produce sound in a frequency range of a full-range driver.

12. The instrument panel of claim 10, wherein the speaker array comprises:

a face plate which supports the plurality of electro-acoustic transducers; and an enclosure which encloses rear radiating surfaces of the electro-acoustic transducers.

13. The instrument panel of claim 12, wherein the face-plate defines a port, and wherein the enclosure acoustically connects the rear radiating surfaces of the transducers with the port.

14. The instrument panel of claim 10, further comprising:

a dovetail mount coupled to the speaker array;

and an adjustment screw coupling the bridge member to the dovetail mount and allowing for adjustment of the position of the speaker assembly relative to the housing.

15. The instrument panel of claim 14, wherein the dovetail mount defines a dove tail groove which slidably receives a second end of the bridge member.

16. The instrument panel of claim 14, further comprising a nut for engaging the adjustment screw, wherein the dovetail mount further define a pocket for receiving and supporting the nut.

17. The instrument panel of claim 10, further comprising a mounting bracket coupled to the housing and configured to support the drive unit and the lever assembly, wherein the mounting bracket comprises a bumper which limits rotation of the lever assembly thereby to inhibit over travel of the lever assembly.

18. The instrument panel of claim 17, wherein the bumper inhibits the speaker array from moving, relative to the housing, from the open position to the closed position when the speaker assembly is exposed to a mechanical force.

* * * * *